United States Patent [19]

Asada et al.

[11] Patent Number: 4,874,668

[45] Date of Patent: Oct. 17, 1989

[54] MAGNETIC POWDER AND MAGNETIC RECORDING MEDIUM COMPRISING THE SAME

[75] Inventors: Seiichi Asada, Osaka; Toshinobu Sueyoshi; Akira Miyake, both of Kyoto, all of Japan

[73] Assignee: Hitachi Maxell, Ltd., Osaka, Japan

[21] Appl. No.: 70,697

[22] Filed: Jul. 7, 1987

[30] Foreign Application Priority Data

Jul. 9, 1986 [JP]   Japan .................................. 61-162580

[51] Int. Cl.$^4$ ................................................ G11B 5/70
[52] U.S. Cl. ..................................... 428/403; 428/404; 428/694; 428/900
[58] Field of Search ................ 428/403, 404, 694, 900

[56] References Cited

U.S. PATENT DOCUMENTS

| | | | |
|---|---|---|---|
| 3,736,181 | 5/1973 | Pye | 428/900 |
| 4,169,802 | 10/1979 | Basile | 428/404 |
| 4,390,361 | 6/1983 | Sueyoshi | 428/405 |
| 4,400,432 | 8/1983 | Buxbaum | 428/403 |
| 4,632,870 | 12/1986 | Takamatsu | 428/329 |

FOREIGN PATENT DOCUMENTS 110037  6/1984  Japan .
217529  10/1985  Japan .

*Primary Examiner*—Paul J. Thibodeau
*Attorney, Agent, or Firm*—Birch, Stewart, Kolasch & Birch

[57] ABSTRACT

Magnetic powder at least a part of particles of which have surface-adjacent layers comprising an aluminium-containing oxide of the corundum structure has high hardness so that a magnetic recording medium comprising a magnetic layer containing such magnetic powder has improved durability.

9 Claims, No Drawings

MAGNETIC POWDER AND MAGNETIC RECORDING MEDIUM COMPRISING THE SAME

BACKGROUND OF THE INVENTION

1. Field of the Invention

The present invention relates to an improved magnetic powder and a magnetic recording medium thereof. More particularly, it relates to magnetic powder having improved durability and a magnetic recording medium comprising the same.

2. Description of the Prior Art

A magnetic recording medium comprises a magnetic layer containing magnetic powder such as $\gamma$-$Fe_2O_3$, cobalt-containing epitaxial $\gamma$-$Fe_2O_3$, ferromagnetic metal, iron nitride or a hexagonal system ferrite. However, when the particle size of the magnetic powder is made smaller in order to decrease noise, durability of the magnetic recording medium is deteriorated due to low hardness of the magnetic powder. This is particularly noticeable when metal powder is used as the magnetic powder, since it has very low hardness.

To solve these problems, covering of the magnetic powder particles with $Al_2O_3$ is proposed (cf. Japanese Patent Kokai Publication No. 134858/1977). According to this proposal, the covering is carried out by applying $Al_2O_3.nH_2O$ on particle surfaces of $\alpha$-FeOOH powder, and thermally reducing the powder in a hydrogen gas stream to produce metal powder particles covered with $Al_2O_3$. However, since the thermal treatment should be done at a temperature not higher than 1,000° C. the on the surfaces remains in the spinel structure and has low hardness.

When $\gamma$-$Fe_2O_3$, cobalt-containing $\gamma$-$Fe_2O_3$ or hexagonal system ferrite is used as the magnetic powder, the same as described above can also apply.

SUMMARY OF THE INVENTION

An object of the present invention is to solve the problems of the prior art and provide a novel magnetic powder and a magnetic recording medium having good durability.

This and other objects are accomplished by providing a magnetic powder at least a part of the particles of which have surface layers comprising an aluminium-containing oxide of the corundum structure.

The magnetic powder according to the present invention has high hardness and the magnetic recording medium utilizing such magnetic powder has good durability.

DETAILED DESCRIPTION OF THE INVENTION

The aluminium-containing oxide of the corundum structure is produced by thermally treating the magnetic powder or a precursor of the magnetic powder when covered with the aluminium-containing oxide above at temperature not lower than 1,000° C.

In a preferred method for transforming the aluminium-containing oxide to the corundum structure, a magnetic powder having a surface region comprising an aluminium-containing oxide and other metal oxides which can be transformed to the corundum structure at low temperature, such as $Cr_2O_3$ is first prepared. Then, the aluminium-containing and other metal oxides can be transformed to the corundum structure even at a low temperature, such as 300° C. due to epitaxial growth.

As the other metal oxides which are transformed to the corundum structure at low temperature, exemplified are $Cr_2O_3$, $Ga_2O_3$, $V_2O_3$ and $\gamma$-$Fe_2O_3$. Among them, $Cr_2O_3$ is preferable. It may contain other element(s) in such a content that the corundum structure is not disturbed.

The aluminium-containing oxide is generally $Al_2O_3$. It may contain other element(s) in such a content that the corundum structure is not disturbed.

For producing the aluminium-containing oxide of the corundum structure on the surfaces of the metal powder particles, $Cr(OH)_3$ and $Al_2O_3.nH_2O$, in the form of a laminate or a mixture, are applied to particle surfaces of acicular powder, such as $\alpha$-FeOOH, $\beta$-FeOOH, $\gamma$-FeOOH, $\gamma$-$Fe_2O_3$, $\alpha$-$Fe_2O_3$, $Fe_3O_4$ or $Fe_2O_3$-$Fe_3O_4$, and then the powder is reduced at a temperature not lower than 300° C. The thermal reduction causes conversion of $Cr(OH)_3$ and $Al_2O_3.nH_2O$ to $Cr_2O_3$ and $Al_2O_3$ having the corundum structure which cover the surfaces of the iron particles formed by reduction of the acicular powder. The reducing temperature is preferably from 300° to 600° C., more preferably from 400° to 550° C., and most preferably from 450° to 550° C. according to the reducing condition of iron oxide. The reason why a temperature range of 300° to 600° C. is preferable is that the reduction rate is too low at temperature lower than 300° C., and sintering among the particles during the reduction easily occurs at a temperature higher than 600 C. Prior to the reduction, thermal treatment is preferably carried out at temperature not lower than 300° C. in an inert gas atmosphere or in an oxidizing atmosphere such as air, since transformation of $Al_2O_3$ to the corundum structure is accelerated by such pre-heating. Generally, the temperature of the pre-heating is preferably from 500° to 1,000° C., more preferably from 600° to 800° C.

For producing the aluminium-containing oxide of the corundum structure on the particle surfaces of $\gamma$-$Fe_2O_3$, $CrO_2$ or hexagonal system ferrite powder, $Cr(OH)_3$ and $Al_2O_3.nH_2O$ in the form of a laminate or a mixture are applied on the surfaces of the magnetic powder particles, and thermally treated in the inert gas or the oxidizing gas at a temperature not lower than 300° C. Since each magnetic powder has its own thermal stability, optimum temperature for thermal treatment depends on the powder. For the hexagonal system ferrite, the optimum temperature range for thermal treatment is from 400° to 1,000° C., for $CrO_2$ from 300 to 450° C., and for $\gamma$-$Fe_2O_3$ from 300° to 400° C. In case of $\gamma$-$Fe_2O_3$, it is pre-heated at temperature of 400° to 1,000° C. to produce $\alpha$-$Fe_2O_3$ and then reduction and oxidation are carried out to produce $\gamma$-$Fe_2O_3$.

Since the magnetic powder produced has a very high hardness, the magnetic recording medium comprising such magnetic powder has improved durability.

An organic binder for the magnetic recording layer comprises a primary binder such as nitrocellulose or a copolymer of vinyl chloride-vinyl acetate, a secondary binder such as urethane, a cross-linking agent such as isocyanate, a radiation curable resin and a thermally curable resin.

The magnetic layer may contain an electrically conductive material such as carbon, a filler such as $Cr_2O_3$, $\gamma$-$Fe_2O_3$, $Al_2O_3$, $TiO_2$ or $SiO_2$, and/or a lubricant such as myristic acid.

An amount of the magnetic powder contained in the magnetic layer is usually from 60 to 85 parts by weight, an amount of the filler is usually from 2 to 20 parts by weight, an amount of the electrically conductive material is usually from 0 to 20 parts by weight, an amount of the organic binder is usually from 10 to 25 parts by weight, and the lubricant is usually from 1 to 15 parts by weight. If necessary, an undercoat layer containing an electrically conductive material and/or a back coat layer can be provided to the magnetic recording medium.

A thickness of the magnetic layer varies according to objects, but is usually from 0.3 to 0.4 μm.

As a substrate, a polyester film, a polyimide film, a polyaramide film, a metal foil and an aluminium alloy foil, and further a composite material thereof can be used.

Preferred Embodiments

The present invention will be hereinafter explained further in detail by following examples.

EXAMPLE 1

As a precursor of magnetic powder, an α-FeOOH solid solution containing 4 % of nickel (major axis=-about 0.3 μm, axial ratio=20) was used. To 1N NaOH suspension (300 l) containing 6 kg of said nickel-containing α-FeOOH, an aqueous solution (1 liter) containing 132 g/l of $Na_4SiO_4$ was added with stirring. Then $CO_2$ gas was bubbled to adjust pH of the suspension to less than 9 to apply $SiO_2.nH_2O$ on particle surfaces of the powder. After the powder was washed with water, filtrated and dried, it was heated in the air at 300° C. for two hours. The powder was resuspended in 0.5N NaOH (300 l), then an aqueous solution (0.7 l) containing $Cr_2(SO_4)_3.18H_2O$ (308.2 g/l) and an aqueous solution (2.9 l) containing $Al_2(SO_4)_3.18H_2O$ (333.2 g/l) were dropwise added with stirring. Then, $CO_2$ gas was bubbled to adjust pH of the suspension to less than 9 to apply $Cr(OH)_3$ and $Al_2O_3.nH_2O$ on particle surfaces of the powder. After the powder was washed with water, filtrated and dried, it was heated in the air at 700° C. for 2 hours. Then, the powder was reduced in hydrogen gas at 500° C. for 5 hours. After cooling, the powder was treated with nitrogen gas containing 1000 ppm of oxygen at 50°–70° C. to oxidize the particle surfaces of the powder. The resultant metal powder particles had a major axis of about 0.2 μm, an axial ratio of about 8 and a specific surface area of 60 m²/g.

EXAMPLE 2

The $SiO_2$-coated nickel-containing α-FeOOH powder (6 kg) prepared in Example 1 was suspended in an aqueous NaOH solution of pH 10 (300 l). To the suspension, an aqueous solution (0.7 l) containing $Cr_2(SO_4)_3.18H_2O$ (308.2 g/l), an aqueous solution (2.9 l) containing $Al_2(SO_4)_3.18H_2O$ (333.2 g/l) and 3N NaOH aqueous solution were dropwise added with stirring and keeping pH of the suspension in a range of 8–10 so as to apply composite hydroxide of $Cr(OH)_3$ and $Al_2O_3.nH_2O$ on the surface of the powder. After adjusting pH to about 7, the powder was washed with water, filtrated and dried. Then, metal powder was produced in the same manner as in Example 1.

EXAMPLES 3 TO 5

Metal powder was produced in the same manner as in Example 2 but changing an amount of applied $Cr_2O_3$ and $Al_2O_3$ as in Table 1.

Comparative Example 1

Metal powder was produced in the same manner as in Example 1 but not using $Cr_2O_3$.

EXAMPLE 6

A magnetic recording medium was prepared by a conventional method by using the metal powder produced in Example 2.

In a 3 l steel ball mill, the magnetic metal powder (100 parts by weight) produced in Example 2, vinyl chloride/vinyl acetate/vinyl alcohol terpolymer (10 parts by weight), polyurethane resin having a number-average molecular weight of 20,000–30,000 (6 parts by weight), myristic acid (5 parts by weight), carbon black (1 part by weight), α-$Al_2O_3$ powder (particle size: 0.4 μm) (5 parts by weight), toluene (85 parts by weight) and methyl isobutyl ketone (85 parts by weight) were added, and rotated for 72 hours to homogeneously disperse them to produce a magnetic paste. To the magnetic paste, toluene (40 parts by weight) and a polyisocyanate compound (2 parts by weight) to prepare a magnetic paint. The magnetic paint was coated on a polyester base film of 12 μm in thickness and dried to form a magnetic layer of 4 μm in thickness. The film was wound.

The film was planished, and then cut in a width of ½ inches to prepare a magnetic tape.

COMPARATIVE EXAMPLE 2

A magnetic tape was prepared in the same manner as in Example 6 but using the magnetic powder produced in Comparative Example 1.

The resultant tapes were evaluated by a Sendust magnetic head having a head gap of 0.3 μm and a head width of 20 μm.

The result is shown in the terms of a relative value of a C/N ratio and an output (C) at a recording wavelength (λ) of 0.7 μm (a value of the magnetic tape of Example 6 being 0 dB).

Time of still life shows a period of time required in which the output decreased by 3 dB from the original output.

TABLE 1

| Example No. | Undercoat layer (wt %) | Aluminum-containing oxide layer (wt %) | Magnetic properties Hc (Oe) | $\sigma_s$ (emu/g) | $\sigma_r/\sigma_s$ | Structure of aluminum-containing oxide layer (by electron diffraction) |
|---|---|---|---|---|---|---|
| 1 | Si/Fe = 0.5 | Cr/Fe = 1.1 laminated<br>Al/Fe = 4.1 | 1,460 | 126 | 0.51 | Corundum |
| 2 | ↑ | Cr/Fe = 1.0 mixed<br>Al/Fe = 4.2 | 1,450 | 128 | 0.51 | ↑ |
| 3 | — | Cr/Fe = 1.0 mixed<br>Al/Fe = 4.1 | 1,420 | 126 | 0.50 | ↑ |
| 4 | — | Cr/Fe = 0.5 mixed<br>Al/Fe = 4.7 | 1,430 | 131 | 0.50 | ↑ |
| 5 | Al/Fe = 1 | Cr/Fe = 2.1 mixed<br>Al/Fe = 2.2 | 1,470 | 135 | 0.52 | ↑ |

TABLE 1-continued

| Example No. | Undercoat layer (wt %) | Aluminum-containing oxide layer (wt %) | Magnetic properties | | | Structure of aluminum-containing oxide layer (by electron diffraction) |
|---|---|---|---|---|---|---|
| | | | Hc (Oe) | $\sigma_s$ (emu/g) | $\sigma_r/\sigma_s$ | |
| Comp. 1 | Si/Fe = 0.5 | Al/Fe = 4.2 | 1,450 | 127 | 0.51 | Spinel or Amorphous |

As is apparent from Table 1, the aluminium-containing oxide layer was transformed to the corundum structure by laminating or mixing $Cr_2O_3$ with $Al_2O_3$.

TABLE 2

| Example No. | Magnetic properties | | | C (dB) | C/N (dB) | Still life (min.) |
|---|---|---|---|---|---|---|
| | Hc(Oe) | Bm(G) | Br/Bm | | | |
| 6 | 1390 | 3300 | 0.82 | 0 | 0 | 80 |
| Comp. 2 | 1380 | 3350 | 0.82 | +0.2 | +0.1 | 25 |

As is apparent from Table 2, about threefold increase of the still life was achieved by transforming $Al_2O_3$ in the particle surfaces to the corundum structure.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. Magnetic powder particles comprising a metal powder and an aluminum-containing oxide which has a corundum structure at least in a surface region of each of said magnetic powder particles.

2. The magnetic powder particles according to claim 1, wherein said surface region of each particle comprises an aluminum-containing oxide which has the corundum structure and at least one oxide selected from the group consisting of chromium oxide, gallium oxide and vanadium oxide which have the corundum structure.

3. The magnetic powder particles according to claim 2, wherein said surface region of each powder particle comprises a laminate layer which comprises a layer of the aluminum-containing oxide of the corundum structure and a layer of at least one oxide selected from the group consisting of chromium oxide, gallium oxide and vanadium oxide which have the corundum structure.

4. The magnetic powder particles according to claim 2, wherein said surface region of each powder particle comprises a layer which comprises a mixture of the aluminum-containing oxide of the corundum structure with at least one oxide selected from the group consisting of chromium oxide, gallium oxide and vanadium oxide which have the corundum structure.

5. The magnetic powder particles according to claim 2, wherein said surface region of each powder particle comprises a layer which comprises a double oxide of aluminum of the corundum structure and at least one element selected from the group consisting of chromium, gallium and vanadium which have the corundum structure.

6. The magnetic powder particles according to claim 2, wherein said surface region of each powder particle comprises an aluminum-containing oxide which has the corundum structure and $Cr_2O_3$ which has the corundum structure.

7. A magnetic recording medium comprising a substrate and at least one magnetic layer which comprises magnetic powder particles dispersed in a binder, said magnetic powder particles comprising a metal powder having an aluminum-containing oxide which has a corundum structure at least in a surface region said metal powder.

8. The magnetic recording medium according to claim 7, wherein said surface region of said magnetic powder particles comprises an aluminum-containing oxide which has the corundum structure and at least one oxide selected from the group consisting of chromium oxide, gallium oxide and vanadium oxide each of which has the corundum structure.

9. The magnetic recording medium according to claim 8, wherein said oxide is $Cr_2O_3$ together with said aluminum-containing oxide, both of the corundum structure.

* * * * *